(12) United States Patent
Grover

(10) Patent No.: US 12,212,795 B2
(45) Date of Patent: *Jan. 28, 2025

(54) CONTENT-MODIFICATION SYSTEM WITH PROBABILITY-BASED SELECTION FEATURE

(71) Applicant: Roku, Inc., San Jose, CA (US)

(72) Inventor: Matthew George Grover, Cardiff (GB)

(73) Assignee: ROKU, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/500,313

(22) Filed: Nov. 2, 2023

(65) Prior Publication Data
US 2024/0064357 A1    Feb. 22, 2024

Related U.S. Application Data

(63) Continuation of application No. 18/058,190, filed on Nov. 22, 2022, now Pat. No. 11,843,813, which is a
(Continued)

(51) Int. Cl.
| | | |
|---|---|---|
| *H04N 21/262* | (2011.01) | |
| *H04N 21/24* | (2011.01) | |
| *H04N 21/266* | (2011.01) | |

(52) U.S. Cl.
CPC ......... *H04N 21/262* (2013.01); *H04N 21/24* (2013.01); *H04N 21/266* (2013.01)

(58) Field of Classification Search
None
See application file for complete search history.

(56) References Cited

U.S. PATENT DOCUMENTS

| | | | | |
|---|---|---|---|---|
| 5,758,257 | A * | 5/1998 | Herz | ............... H04N 21/4332 348/E7.071 |
| 6,463,585 | B1 * | 10/2002 | Hendricks | ............... H04N 21/47 348/E5.103 |

(Continued)

FOREIGN PATENT DOCUMENTS

| | | |
|---|---|---|
| EP | 2234371 B1 | 12/2011 |
| KR | 1020120114251 A | 10/2012 |

OTHER PUBLICATIONS

International Searching Authority, International Search Report and Written Opinion, mailed Sep. 11, 2020, issued in connection with International Application No. PCT/US2020/036456.

*Primary Examiner* — An Son P Huynh
(74) *Attorney, Agent, or Firm* — Sterne, Kessler, Goldstein & Fox P.L.L.C.

(57) ABSTRACT

In one aspect, a method includes identifying an upcoming content modification opportunity on a channel. The method also includes responsive to identifying the upcoming content modification opportunity on the channel, identifying a group of multiple content-presentation devices tuned to the channel. The method also includes for each content-presentation device in the identified group, determining a respective probability of that content-presentation device successfully performing a respective content-modification operation in connection with the identified upcoming content modification opportunity on the channel. The method also includes using at least the determined probabilities as a basis to select, from among the content-presentation devices in the identified group, a subgroup of content-presentation devices. The method also includes performing actions that facilitate causing each of at least some of the content-presentation devices in the selected subgroup to perform a respective content-modification operation in connection with the iden- (Continued)

tified upcoming content modification opportunity on the channel.

20 Claims, 10 Drawing Sheets

Related U.S. Application Data continuation of application No. 16/853,932, filed on Apr. 21, 2020, now Pat. No. 11,546,647.

(60) Provisional application No. 62/858,859, filed on Jun. 7, 2019.

(56) References Cited

U.S. PATENT DOCUMENTS

| | | | | |
|---|---|---|---|---|
| 6,615,039 | B1* | 9/2003 | Eldering | H04N 21/8455 455/418 |
| 6,799,326 | B2* | 9/2004 | Boylan, III | H04N 21/478 725/138 |
| 7,240,355 | B1* | 7/2007 | Eldering | H04N 21/84 348/E5.002 |
| 7,949,565 | B1* | 5/2011 | Eldering | H04H 20/10 705/14.49 |
| 8,505,054 | B1* | 8/2013 | Kirley | H04N 21/436 725/74 |
| 9,146,990 | B2 | 9/2015 | Scherf et al. | |
| 9,270,718 | B2* | 2/2016 | Emerson, III | H04L 65/764 |
| 9,363,464 | B2* | 6/2016 | Alexander | H04N 21/44213 |
| 9,495,451 | B2 | 11/2016 | Harron | |
| 9,510,044 | B1* | 11/2016 | Pereira | H04H 60/59 |
| 9,992,533 | B2 | 6/2018 | Lee et al. | |
| 10,085,072 | B2 | 9/2018 | Shimy et al. | |
| 10,231,033 | B1* | 3/2019 | Bumgarner | H04N 21/8547 |
| 10,362,357 | B1* | 7/2019 | Bates | H04N 21/42202 |
| 10,390,077 | B2* | 8/2019 | Depies | H04N 21/2387 |
| 10,506,275 | B1 | 12/2019 | Thielen et al. | |
| 10,749,852 | B2* | 8/2020 | Thomas | H04W 12/50 |
| 10,755,747 | B2* | 8/2020 | Bloch | G11B 27/034 |
| 2002/0056087 | A1 | 5/2002 | Berezowski | H04N 21/488 348/E7.071 |
| 2002/0072966 | A1* | 6/2002 | Eldering | H04N 7/165 348/E7.063 |
| 2002/0104083 | A1* | 8/2002 | Hendricks | H04N 21/4316 348/E5.103 |
| 2002/0144262 | A1* | 10/2002 | Plotnick | H04N 21/458 348/E7.071 |
| 2003/0020744 | A1* | 1/2003 | Ellis | H04N 21/4782 348/E7.063 |
| 2003/0208767 | A1* | 11/2003 | Williamson | H04N 21/4325 348/E7.071 |
| 2004/0015999 | A1* | 1/2004 | Carlucci | H04N 21/454 348/E7.071 |
| 2004/0250272 | A1 | 12/2004 | Durden et al. | |
| 2005/0149964 | A1* | 7/2005 | Thomas | H04N 21/442 348/E7.071 |
| 2006/0212900 | A1* | 9/2006 | Ismail | H04N 21/44224 725/35 |
| 2006/0287912 | A1* | 12/2006 | Raghuvamshi | G06Q 30/0241 705/14.4 |
| 2007/0136753 | A1* | 6/2007 | Bovenschulte | H04N 7/17318 348/E7.071 |
| 2008/0301746 | A1* | 12/2008 | Wiser | H04N 21/47202 725/114 |
| 2009/0165049 | A1* | 6/2009 | Sekiguchi | H04N 21/41265 725/39 |
| 2009/0288110 | A1* | 11/2009 | Logan | H04H 20/28 725/24 |
| 2011/0029374 | A1* | 2/2011 | Kodialam | G06Q 30/0264 705/14.42 |
| 2011/0078717 | A1* | 3/2011 | Drummond | H04N 21/4821 715/764 |
| 2011/0145856 | A1* | 6/2011 | Agarwal | H04N 21/25435 725/32 |
| 2012/0254911 | A1* | 10/2012 | Doe | H04N 21/4524 725/14 |
| 2013/0031582 | A1* | 1/2013 | Tinsman | H04N 21/4316 725/36 |
| 2013/0325954 | A1* | 12/2013 | Cupala | G06F 3/0484 709/204 |
| 2013/0347047 | A1* | 12/2013 | Tanaka | H04N 21/23611 725/110 |
| 2014/0068692 | A1* | 3/2014 | Archibong | H04N 21/6334 725/116 |
| 2014/0150019 | A1 | 5/2014 | Ma et al. | |
| 2014/0359683 | A1* | 12/2014 | Applegate | H04N 21/47202 725/95 |
| 2016/0094875 | A1* | 3/2016 | Peterson | H04N 21/4312 725/41 |
| 2016/0150297 | A1* | 5/2016 | Petrovic | H04N 21/23892 725/25 |
| 2016/0295303 | A1* | 10/2016 | Srinivasan | H04N 21/23424 |
| 2016/0335562 | A1* | 11/2016 | Zeng | H04N 1/00127 |
| 2017/0111705 | A1* | 4/2017 | Ma | H04N 21/4382 |
| 2017/0127104 | A1* | 5/2017 | Thomas | H04N 21/2407 |
| 2017/0150213 | A1* | 5/2017 | Cremer | H04N 21/458 |
| 2017/0164050 | A1* | 6/2017 | Rai | H04N 21/4667 |
| 2018/0063765 | A1* | 3/2018 | Bansal | H04W 36/322 |
| 2018/0098122 | A1* | 4/2018 | Cho | H04N 21/44204 |
| 2018/0098133 | A1* | 4/2018 | Liassides | H04N 21/44204 |
| 2018/0262798 | A1* | 9/2018 | Ramachandra | H04N 21/4828 |
| 2019/0230387 | A1* | 7/2019 | Gersten | G06F 16/783 |
| 2019/0261061 | A1* | 8/2019 | Liassides | G06Q 30/02 |
| 2019/0349344 | A1* | 11/2019 | Thomas | H04W 12/63 |
| 2019/0378048 | A1* | 12/2019 | Shrivastava | G06F 16/90335 |
| 2020/0029108 | A1 | 1/2020 | Dunker et al. | |
| 2020/0029114 | A1* | 1/2020 | Kim | H04N 21/4758 |
| 2020/0032039 | A1 | 10/2020 | Sarda et al. | |
| 2020/0329039 | A1* | 10/2020 | Sarda | H04L 63/0428 |

* cited by examiner

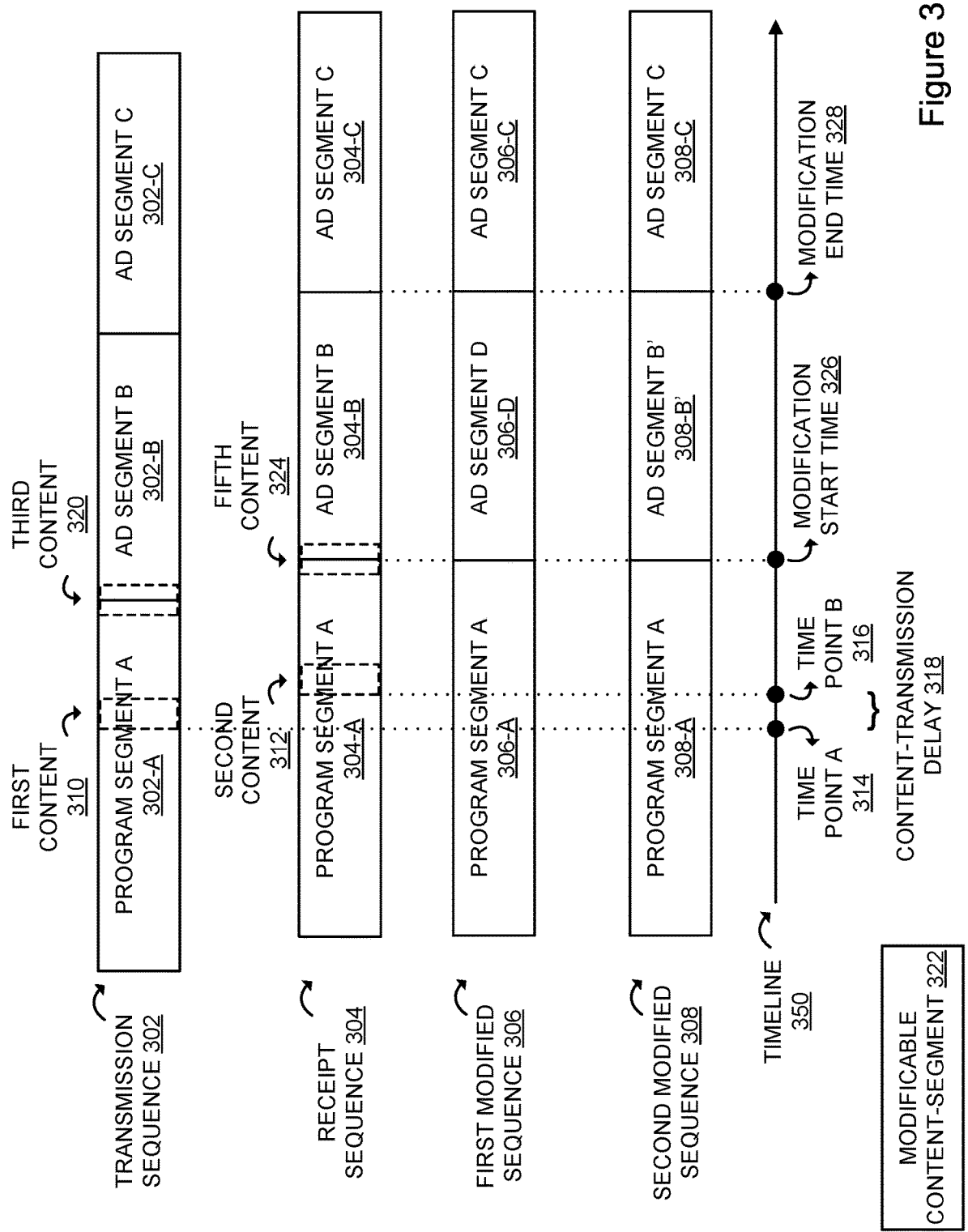

| Time Period | Content-Distribution System 102 | Content-Presentation Device 104 | Fingerprint-Matching Server 106 | Content-Management System 108 | Data-Management System 110 | Supplemental-Content Delivery System 112 |
|---|---|---|---|---|---|---|
| T1 | Transmit first content on a channel | | | | | |
| T2 | Generate first fingerprint data and first metadata | | | | | |
| T3 | Transmit first fingerprint data and first metadata | | | | | |
| T4 | | Receive second content | | | | |
| T5 | | Generate second fingerprint data and second metadata | | | | |
| T6 | | Transmit second fingerprint data and second metadata | | | | |
| T7 | | | Receive first fingerprint data and first metadata | | | |
| T8 | | | Receive second fingerprint data and second metadata | | | |

Figure 4A

| | | | | | |
|---|---|---|---|---|---|
| T9 | Compare first fingerprint data and second fingerprint data | | | | |
| T10 | Detect a match between first fingerprint data and second fingerprint data | | | | |
| T11 | Identify the channel on which the second content is being received | | | | |
| T12 | Generate metadata associated with the identified channel | | | | |
| T13 | Transmit an indication of the identified channel and the associated metadata | | | | |
| T14 | | | Receive the indication of the identified channel and the associated metadata | | |

Figure 4B

| | | | | | |
|---|---|---|---|---|---|
| T15 | | Determine historical content consumption data | | | |
| T16 | Transmit third content | | | | |
| T17 | Generate third fingerprint data and third metadata | | | | |
| T18 | Transmit third fingerprint data and third metadata | | | | |
| T19 | | | | | |
| T20 | | | Receive modifiable content segment Generate fourth fingerprint data and fourth metadata Transmit fourth fingerprint data and fourth metadata | | |
| T21 | | | | | |
| T22 | | | | Receive third fingerprint data and third metadata | |
| T23 | | | | Receive fourth fingerprint data and fourth metadata | |

Figure 4C

| | | | | | | |
|---|---|---|---|---|---|---|
| T24 | | | | | | |
| T25 | Compare at least a portion of third fingerprint data and at least a portion of fourth fingerprint data | | | | | |
| T26 | Detect a match between at least a portion of third fingerprint data and at least a portion of fourth fingerprint data | | | | | |
| T27 | Identify an upcoming content modification opportunity on the identified channel | | | | | |
| T28 | Transmit the third fingerprint data and the third metadata | | | | | |
| T29 | | Receive third fingerprint data and third metadata | | | | |
| T30 | | Receive fifth content | | | | |
| | | Output for presentation fifth content | | | | |

Figure 4D

| | | | | | | | |
|---|---|---|---|---|---|---|---|
| T31 | Generate fifth fingerprint data and fifth metadata | | | | | | |
| T32 | Compare the third fingerprint data and the fifth fingerprint data | | | | | | |
| T33 | Detect a match between the third fingerprint data and the fifth fingerprint data | | | | | | |
| T34 | Determine modification start time and modification end time | | | | | | |
| T35 | Transmit a request for supplemental content | | | | | | |
| T36 | | | | Receive request and select supplemental content | | | |
| T37 | | | | Transmit request for link | | | |
| T38 | | | | | | | Transmit link |

Figure 4E

| T39 | | | | | | |
|-----|---|---|---|---|---|---|
| T40 | Receive link and retrieve supplemental content | | | | | |
| T41 | Perform content modification operation | | Transmit link | | | |

Figure 4F

CONTENT-MODIFICATION SYSTEM WITH PROBABILITY-BASED SELECTION FEATURE

RELATED DISCLOSURES

This application is a continuation of U.S. patent application Ser. No. 18/058,190, filed Nov. 22, 2022, which is a continuation of U.S. patent application Ser. No. 16/853,932, filed Apr. 21, 2020, now U.S. Pat. No. 11,546,647, which claims priority to U.S. Provisional Pat. App. No. 62/858,859 filed Jun. 7, 2019, which is hereby incorporated by reference herein in its entirety.

USAGE AND TERMINOLOGY

In this disclosure, unless otherwise specified and/or unless the particular context clearly dictates otherwise, the terms "a" or "an" mean at least one, and the term "the" means at least one.

SUMMARY

In one aspect, a method is disclosed. The method includes identifying an upcoming content modification opportunity on a channel. The method also includes responsive to identifying the upcoming content modification opportunity on the channel, identifying a group of multiple content-presentation devices tuned to the channel. The method also includes for each content-presentation device in the identified group, determining a respective probability of that content-presentation device successfully performing a respective content-modification operation in connection with the identified upcoming content modification opportunity on the channel. The method also includes using at least the determined probabilities as a basis to select, from among the content-presentation devices in the identified group, a subgroup of content-presentation devices. The method also includes performing actions that facilitate causing each of at least some of the content-presentation devices in the selected subgroup to perform a respective content-modification operation in connection with the identified upcoming content modification opportunity on the channel.

In another aspect, a non-transitory computer-readable storage medium is disclosed. The computer-readable storage medium has stored thereon program instructions that, upon execution by a processor, cause performance of a set of operations. The set of operations includes identifying an upcoming content modification opportunity on a channel. The set of operations also includes responsive to identifying the upcoming content modification opportunity on the channel, identifying a group of multiple content-presentation devices tuned to the channel. The set of operations also includes for each content-presentation device in the identified group, determining a respective probability of that content-presentation device successfully performing a respective content-modification operation in connection with the identified upcoming content modification opportunity on the channel. The set of operations also includes using at least the determined probabilities as a basis to select, from among the content-presentation devices in the identified group, a subgroup of content-presentation devices. The set of operations also includes performing actions that facilitate causing each of at least some of the content-presentation devices in the selected subgroup to perform a respective content-modification operation in connection with the identified upcoming content modification opportunity on the channel.

In another aspect, a computing system includes a processor and a non-transitory computer-readable storage medium, having stored thereon program instructions that, upon execution by the processor, cause performance of a set of operations. The set of operations includes identifying an upcoming content modification opportunity on a channel. The set of operations also includes responsive to identifying the upcoming content modification opportunity on the channel, identifying a group of multiple content-presentation devices tuned to the channel. The set of operations also includes for each content-presentation device in the identified group, determining a respective probability of that content-presentation device successfully performing a respective content-modification operation in connection with the identified upcoming content modification opportunity on the channel. The set of operations also includes using at least the determined probabilities as a basis to select, from among the content-presentation devices in the identified group, a subgroup of content-presentation devices. The set of operations also includes performing actions that facilitate causing each of at least some of the content-presentation devices in the selected subgroup to perform a respective content-modification operation in connection with the identified upcoming content modification opportunity on the channel.

BRIEF DESCRIPTION OF THE DRAWINGS

FIG. 3 is a diagram of example linear sequences of content and related concepts.

FIGS. 4A, 4B, 4C, 4D, 4E, and 4F collectively make up a table showing example time-periods and corresponding operations that can be performed in connection with the example content-modification system.

DETAILED DESCRIPTION

I. Overview

Figure 1:
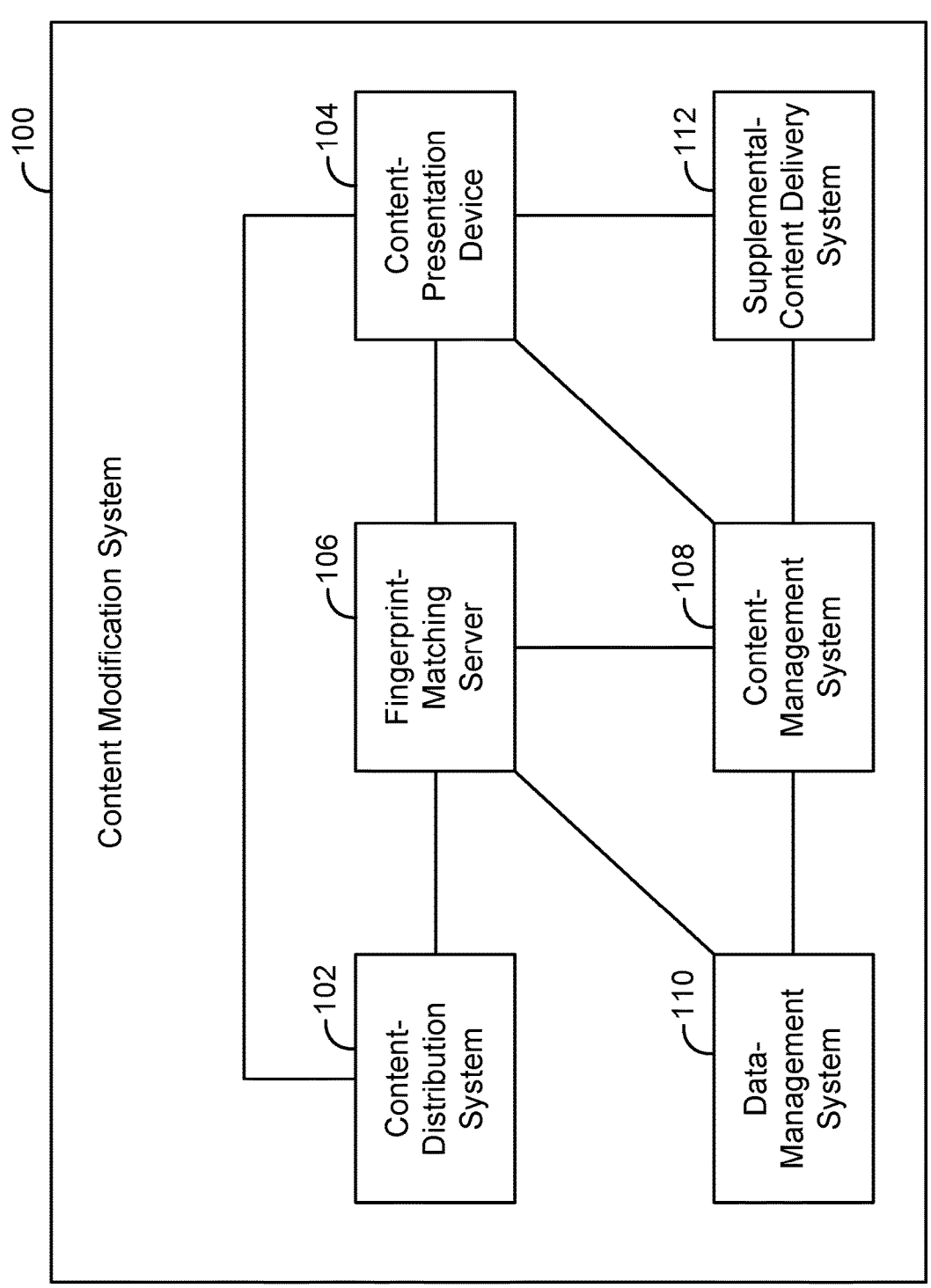
FIG. 1 is a simplified block diagram of an example content-modification system in which various described principles can be implemented.

To deliver and present content to end-users, a content provider can transmit the content to one or more content-distribution systems, each of which can in turn transmit the content to one or more respective content-presentation devices to be output for presentation to respective end-users. Such a hierarchical arrangement can facilitate convenient, widespread distribution of content.

By way of example, in order for a video content provider to deliver video content to end-users throughout the United States, the video content provider can transmit the video content by satellite or another medium to content-distribution systems that serve respective designated market areas (DMAs) within the United States. Each such content-distribution system can therefore receive the national satellite feed carrying the video content and can transmit the video content to television sets and/or set-top boxes in the content-distribution system's DMA, such that the video content can be output for presentation to respective end-users in that DMA. In practice, these content-distribution systems and their means of transmission to content-presentation devices can take various forms. For instance, a content-distribution system can be associated with a cable-television provider and can transmit video content to content-presentation devices of end-users who are cable-television subscribers through hybrid fiber/coaxial cable connections.

As such, in various scenarios, a content-distribution system can transmit content to a content-presentation device, which can receive and output the content for presentation to an end-user. In some situations, even though the content-presentation device receives content from the content-distribution system, it can be desirable for the content-presentation device to perform a content-modification operation so that the content-presentation device can output for presentation alternative content instead of at least a portion of that received content.

For example, in the case where the content-presentation device receives a linear sequence of content segments that includes a given advertisement segment positioned somewhere within the sequence, it can be desirable for the content-presentation device to replace the given advertisement segment with a different advertisement segment that is perhaps more targeted to the end-user (e.g., more targeted to the end-user's interests, demographics, etc.). This type of advertisement replacement is also referred to herein as "dynamic ad replacement (DAI)." As another example, it can be desirable for the content-presentation device to overlay on the given advertisement segment, overlay content that enhances the given advertisement segment in a way that is again perhaps more targeted to the end-user. The described content-modification system can facilitate providing these and other related features.

In some situations, it might be desirable for the content-modification system to request a group of numerous (e.g., hundreds) content-presentation devices to perform a DAI operation with respect to a given content segment (also referred to herein as a "modifiable content-segment") in an upcoming DAI opportunity on a particular channel. For example, the content-modification system can provide a replacement advertisement segment that is targeted to hundreds or thousands of end-users of a particular demographic. In these situations, that group of content-presentation devices would ideally retrieve the replacement advertisement segment and timely replace a given advertisement segment with the replacement advertisement segment.

Sometimes in these situations, however, one or more of the content-presentation devices in the desired group are not able to carry out a DAI operation with respect to an upcoming DAI opportunity on a channel. This might occur for various reasons. For example, a content-presentation device might experience bandwidth issues that can prevent the content-presentation device from being able to retrieve the replacement advertisement segment on time to perform the DAI operation. As another example, a content-transmission delay between the content-distribution system and the content-presentation device might be short enough where the content-presentation device will not be able to retrieve the replacement advertisement segment in time to perform the DAI operation at a scheduled start-time for the replacement.

To account for this possibility, the fingerprint-matching server or other component of the content-modification system might be configured to transmit requests to more content-presentation devices than needed. For example, if it is desirable for one hundred content-presentation devices to perform a DAI operation with respect to an upcoming DAI opportunity, the content-modification system might transmit requests to one hundred and twenty or more content-presentation devices, in hopes that at least one hundred of those content-presentation devices will be able to successfully perform the DAI operation. Additionally or alternatively to this, there are other actions the content-modification system might perform to account for the possibility that a less-than-desired quantity of content-presentation devices are able to complete a DAI operation. These and other actions can be inefficient and computationally expensive, and thus, an alternative solution is desired.

The present disclosure improves upon existing content-modification systems by using a probability of success as a basis for selecting which content-presentation devices should perform a content-modification operation such as DAI. More particularly, the content-modification system (e.g., the fingerprint-matching server and/or other component of the content-modification system) can identify a group of multiple content-presentation devices tuned to a channel on which an upcoming content modification opportunity has been identified. For each content-presentation device in the identified group, the content-modification system can determine a respective probability of that content-presentation device successfully performing a respective content-modification operation in connection with the identified upcoming content modification opportunity on the channel. For instance, this probability might be determined based on historical data that indicates whether each content-presentation device has successfully performed the same or similar content-modification operations in the past.

Having determined the probabilities, the content-modification system can use at least the determined probabilities as a basis to select, from among the content-presentation devices in the identified group, a subgroup of content-presentation devices. The content-modification system can also then perform actions that facilitate causing each of at least some of the content-presentation devices in the selected subgroup to perform a respective content-modification operation in connection with the identified upcoming content modification opportunity.

By assessing the probability of success in this way, the content-modification system 100 can more efficiently and reliably select content-presentation devices to perform DAI or other content-modification operations with a higher chance of success at completing the content-modification operations as desired. This can also be particularly useful in situations where it is desirable to have numerous (e.g., hundreds or thousands) content-presentation devices perform a content-modification operation relative to an upcoming content-modification opportunity on the same channel.

II. Architecture

A. Content-Modification System

FIG. 1 is a simplified block diagram of an example content-modification system 100. The content-modification system 100 can include various components, such as a content-distribution system 102, a content-presentation device 104, a fingerprint-matching server 106, a content-management system 108, a data-management system 110, and/or a supplemental-content delivery system 112.

The content-modification system 100 can also include one or more connection mechanisms that connect various components within the content-modification system 100. For example, the content-modification system 100 can include the connection mechanisms represented by lines connecting components of the content-modification system 100, as shown in FIG. 1.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

The content-modification system 100 and/or components thereof can take the form of a computing system, an example of which is described below.

Notably, in practice, the content-modification system 100 is likely to include many instances of at least some of the described components. For example, the content-modification 100 is likely to include many content-distribution systems and many content-presentation devices.

B. Computing System

Figure 2:
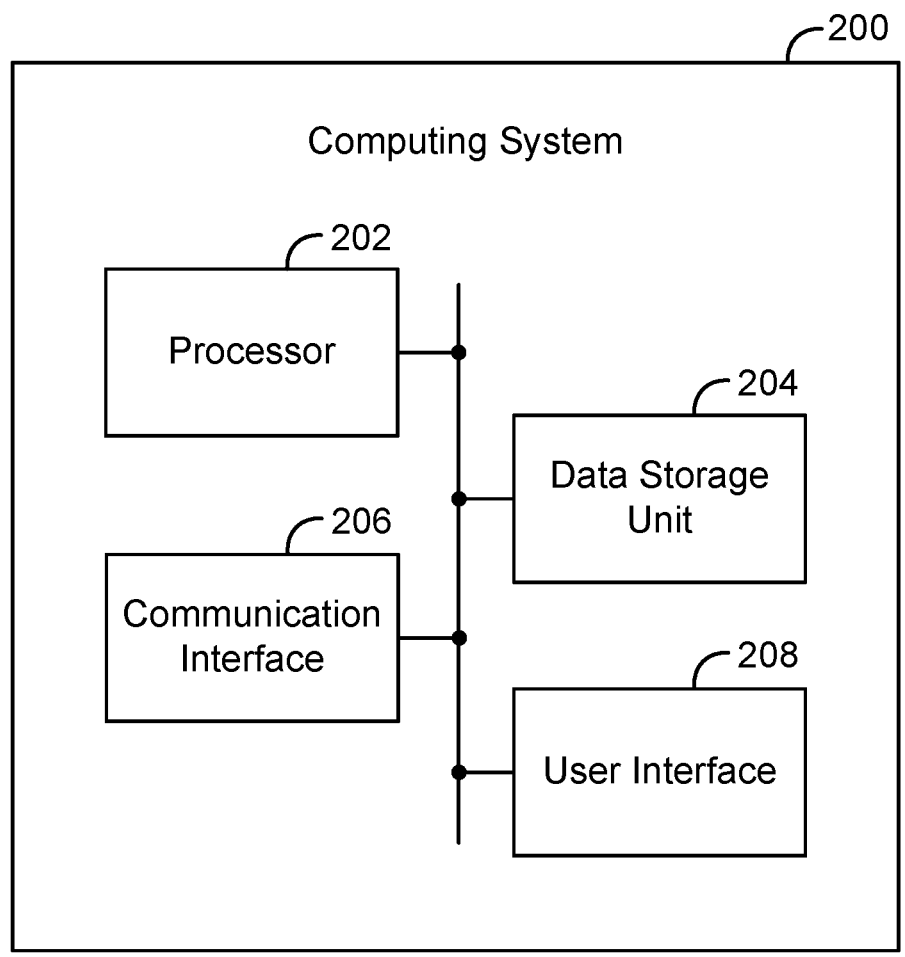
FIG. 2 is a simplified block diagram of an example computing system in which various described principles can be implemented.

FIG. 2 is a simplified block diagram of an example computing system 200. The computing system 200 can be configured to perform and/or can perform one or more operations, such as the operations described in this disclosure. The computing system 200 can include various components, such as a processor 202, a data-storage unit 204, a communication interface 206, and/or a user interface 208.

The processor 202 can be or include a general-purpose processor (e.g., a microprocessor) and/or a special-purpose processor (e.g., a digital signal processor). The processor 202 can execute program instructions included in the data-storage unit 204 as described below.

The data-storage unit 204 can be or include one or more volatile, non-volatile, removable, and/or non-removable storage components, such as magnetic, optical, and/or flash storage, and/or can be integrated in whole or in part with the processor 202. Further, the data-storage unit 204 can be or include a non-transitory computer-readable storage medium, having stored thereon program instructions (e.g., compiled or non-compiled program logic and/or machine code) that, upon execution by the processor 202, cause the computing system 200 and/or another computing system to perform one or more operations, such as the operations described in this disclosure. These program instructions can define, and/or be part of, a discrete software application.

In some instances, the computing system 200 can execute program instructions in response to receiving an input, such as an input received via the communication interface 206 and/or the user interface 208. The data-storage unit 204 can also store other data, such as any of the data described in this disclosure.

The communication interface 206 can allow the computing system 200 to connect with and/or communicate with another entity according to one or more protocols. Therefore, the computing system 200 can transmit data to, and/or receive data from, one or more other entities according to one or more protocols. In one example, the communication interface 206 can be or include a wired interface, such as an Ethernet interface or a High-Definition Multimedia Interface (HDMI). In another example, the communication interface 206 can be or include a wireless interface, such as a cellular or WI-FI interface.

The user interface 208 can allow for interaction between the computing system 200 and a user of the computing system 200. As such, the user interface 208 can be or include an input component such as a keyboard, a mouse, a remote controller, a microphone, and/or a touch-sensitive panel. The user interface 208 can also be or include an output component such as a display device (which, for example, can be combined with a touch-sensitive panel) and/or a sound speaker.

The computing system 200 can also include one or more connection mechanisms that connect various components within the computing system 200. For example, the computing system 200 can include the connection mechanisms represented by lines that connect components of the computing system 200, as shown in FIG. 2.

The computing system 200 can include one or more of the above-described components and can be configured or arranged in various ways. For example, the computing system 200 can be configured as a server and/or a client (or perhaps a cluster of servers and/or a cluster of clients) operating in one or more server-client type arrangements, for instance.

As noted above, the content-modification system 100 and/or components thereof can take the form of a computing system, such as the computing system 200. In some cases, some or all these entities can take the form of a more specific type of computing system. For instance, in the case of the content-presentation device 104, it can take the form of a desktop computer, a laptop, a tablet, a mobile phone, a television set, a set-top box, a television set with an integrated set-top box, a media dongle, or a television set with a media dongle connected to it, among other possibilities.

III. Example Operations

The content-modification system 100 and/or components thereof can be configured to perform and/or can perform one or more operations. Examples of these operations and related features will now be described.

As noted above, in practice, the content-modification system 100 is likely to include many instances of at least some of the described components. Likewise, in practice, it is likely that at least some of described operations will be performed many times (perhaps on a routine basis and/or in connection with additional instances of the described components).

A. Operations Related to the Content-Distribution System Transmitting Content and the Content-Presenting Device Receiving and Outputting Content For context, general operations and examples related to the content-distribution system 102 transmitting content and the content-presentation device 104 receiving and outputting content will now be described.

To begin, the content-distribution system 102 can transmit content (e.g., that it received from a content provider) to one or more entities such as the content-presentation device 104. Content can be or include audio content and/or video content, for example. In some examples, content can take the form of a linear sequence of content segments (e.g., program segments and advertisement segments) or a portion thereof. In the case of video content, a portion of the video content may be one or more frames, for example.

The content-distribution system 102 can transmit content on one or more channels (sometimes referred to as stations or feeds). As such, the content-distribution system 102 can be associated with a single channel content distributor or a multi-channel content distributor such as a multi-channel video program distributor (MVPD).

The content-distribution system 102 and its means of transmission of content on the channel to the content-presentation device 104 can take various forms. By way of example, the content-distribution system 102 can be or include a cable-television head-end that is associated with a cable-television provider and that transmits the content on the channel to the content-presentation device 104 through hybrid fiber/coaxial cable connections. As another example, the content-distribution system 102 can be or include a satellite-television head-end that is associated with a satellite-television provider and that transmits the content on the channel to the content-presentation device 104 through a satellite transmission. As yet another example, the content-distribution system 102 can be or include a television-broadcast station that is associated with a television-broadcast provider and that transmits the content on the channel through a terrestrial over-the-air interface to the content-presentation device 104. In these and other examples, the content-distribution system 102 can transmit the content in the form of an analog or digital broadcast stream representing the content.

The content-presentation device 104 can receive content from one or more entities, such as the content-distribution system 102. In one example, the content-presentation device 104 can select (e.g., by tuning to) a channel from among multiple available channels, perhaps based on input received via a user interface, such that the content-presentation device 104 can receive content on the selected channel.

In some examples, the content-distribution system 102 can transmit content to the content-presentation device 104, which the content-presentation device 104 can receive, and therefore the transmitted content and the received content can be the same. However, in other examples, they can be different, such as where the content-distribution system 102 transmits content to the content-presentation device 104, but the content-presentation device 104 does not receive the content and instead receives different content from a different content-distribution system.

The content-presentation device 104 can also output content for presentation. As noted above, the content-presentation device 104 can take various forms. In one example, in the case where the content-presentation device 104 is a television set (perhaps with an integrated set-top box and/or media dongle), outputting the content for presentation can involve the television set outputting the content via a user interface (e.g., a display device and/or a sound speaker), such that it can be presented to an end-user. As another example, in the case where the content-presentation device 104 is a set-top box or a media dongle, outputting the content for presentation can involve the set-top box or the media dongle outputting the content via a communication interface (e.g., an HDMI interface), such that it can be received by a television set and in turn output by the television set for presentation to an end-user.

As such, in various scenarios, the content-distribution system 102 can transmit content to the content-presentation device 104, which can receive and output the content for presentation to an end-user. In some situations, even though the content-presentation device 104 receives content from the content-distribution system 102, it can be desirable for the content-presentation device 104 to perform a content-modification operation so that the content-presentation device 104 can output for presentation alternative content instead of at least a portion of that received content.

For example, in the case where the content-presentation device 104 receives a linear sequence of content segments that includes a given advertisement segment positioned somewhere within the sequence, it can be desirable for the content-presentation device 104 to replace the given advertisement segment with a different advertisement segment that is perhaps more targeted to the end-user (i.e., more targeted to the end-user's interests, demographics, etc.). As another example, it can be desirable for the content-presentation device 104 to overlay on the given advertisement segment, overlay content that enhances the given advertisement segment in a way that is again perhaps more targeted to the end-user. The described content-modification system 100 can facilitate providing these and other related features.

As noted above, in one example, content can take the form of a linear sequence of content segments. As such, in one example, the content-distribution system 102 can transmit a linear sequence of content segments. This is referred to herein as a "transmission sequence." Likewise, the content-presentation device 104 can receive a linear sequence of content segments. This is referred to herein as a "receipt sequence." In line with the discussion above, the transmission sequence and the receipt sequence can be the same or they can be different.

FIG. 3 illustrates some examples of these concepts. In one example, the transmission sequence is the TRANSMISSION SEQUENCE 302 shown in FIG. 3. As shown, the TRANSMISSION SEQUENCE 302 includes a PROGRAM SEGMENT A 302-A, followed by an AD SEGMENT B 302-B, followed by AD SEGMENT C 302-C.

Likewise, in one example, the receipt sequence is the RECEIPT SEQUENCE 304 shown in FIG. 3. In this example, the content-distribution system 102 transmits the TRANSMISSION SEQUENCE 302 to the content-presentation device 104, which the content-presentation device 104 receives as the RECEIPT SEQUENCE 304, and therefore the TRANSMISSION SEQUENCE 302 and the RECEIPT SEQUENCE 304 are the same. As such, as shown, the RECEIPT SEQUENCE 304 also includes the PROGRAM SEGMENT A 304-A, followed by the AD SEGMENT B 304-B, followed by the AD SEGMENT C 302-C.

In FIG. 3, the transmission time of the TRANSMISSION SEQUENCE 302 and the receipt time of the RECEIPT SEQUENCE 304 are shown by way of their relationship to a TIMELINE 350. Notably, the transmission time and the receipt time are offset from each other due to a content-transmission delay, which is described in greater detail below.

As noted above, in some situations, even though the content-presentation device 104 receives content from the content-distribution system 102, it can be desirable for the content-presentation device 104 to perform a content-modification operation so that the content-presentation device 104 can output for presentation alternative content instead of at least a portion of that received content. For example, in the case where the content-presentation device 104 receives the receipt sequence, rather than outputting for presentation the receipt sequence, the content-presentation device 104 can output for presentation a modified version of the receipt sequence instead. This is referred to herein as a "modified sequence."

For example, in the case where the receipt sequence includes a given advertisement segment positioned somewhere within the receipt sequence, it can be desirable for the content-presentation device 104 to replace the given advertisement segment with a different advertisement segment that is perhaps more targeted to the end-user (i.e., more targeted to the end-user's interests, demographics, etc.), thereby resulting in a modified sequence that the content-presentation device 104 can output for presentation.

To illustrate this, in one example, the modified sequence is the FIRST MODIFIED SEQUENCE 306 shown in FIG. 3. As shown, the FIRST MODIFIED SEQUENCE 306 includes the PROGRAM SEGMENT A 306-A, followed by the AD SEGMENT D 306-D (which replaced the AD SEGMENT B 304-B), followed by AD SEGMENT C 306-C.

As another example, it can be desirable for the content-presentation device 104 to overlay on the given advertisement segment, overlay content that enhances the given advertisement segment in a way that is again perhaps more targeted to the end-user, thereby resulting in a modified sequence that the content-presentation device 104 can output for presentation.

To illustrate this, in another example, the modified sequence is the SECOND MODIFIED SEQUENCE 308 shown in FIG. 3. As shown, the SECOND MODIFIED SEQUENCE 308 includes the PROGRAM SEGMENT A 308-A, followed by the AD SEGMENT B' 308-B' (which is the AD SEGMENT B 304-B modified with overlay content), followed by AD SEGMENT C 308-C.

Other portions of FIG. 3 will be described later in this disclosure as related concepts are introduced and described.

Moving on in view of the context provided above, FIGS. 4A, 4B, 4C, 4D, 4E, and 4F, collectively make up a table showing example time-periods and corresponding operations that can be performed in connection with the content-modification system 100. These and other related operations will now be described.

B. Operations Related to the Content-Distribution System Transmitting First Content on a Channel During a time-period T1, the content-distribution system 102 can transmit content on a channel to the content-presentation device 104. This content is referred to herein as "first content." In one example, the first content is the FIRST CONTENT 310 shown in FIG. 3.

During a time-period T2, the content-distribution system 102 can generate fingerprint data representing the first content. This fingerprint data is referred to herein as "first fingerprint data." The content-distribution system 102 can generate the first fingerprint data using any content fingerprinting process now known or later developed. An example fingerprint generation technique is described in U.S. Pat. No. 9,495,451 issued Nov. 15, 2016, the entirety of which is hereby incorporated by reference herein. The content-distribution system 102 can generate first fingerprint data at a given rate, such as at the rate of one fingerprint per frame of the first content. The first fingerprint data can be or include some or all of these generated fingerprints.

The content-distribution system 102 can access the first content at various points within the content-distribution system 102. As one example, the content-distribution system 102 can access the first content after it is output by a distribution amplifier within the content-distribution system 102.

Also during the time-period T2, the content-distribution system 102 can generate metadata associated with the first content and/or the first fingerprint data. This metadata is referred to herein as "first metadata." In one example, the first metadata can be or include a transmission time-stamp, which represents a time-point at which the content-distribution system 102 transmitted the first content. The content-distribution system 102 can determine the transmission time-stamp in various ways, such as based on a time clock that is synchronized to a reference clock.

As another example, the first metadata can be or include a channel identifier, which identifies the channel on which the content-distribution system 102 is transmitting the first content. The content-distribution system 102 can determine the channel identifier in various ways such as based on mapping data that maps the content-distribution system 102 and/or physical inputs and/or outputs within the content-distribution system 102 to respective channel identifiers. In one example, in the case where the content-distribution system 102 transmits content A on channel A, content B on channel B, and content C on channel C, the mapping data can specify which of three different outputs (perhaps on three different distribution amplifiers) maps to which channel identifier, such that the content-distribution system 102 can determine the appropriate channel identifier for content of a given channel.

As another example, the first metadata can be or include SCTE-104 data, a watermark, or a similar type of metadata, any of which can themselves encode other metadata, such as a program identifier, an advertisement identifier (e.g., an industry standard coding identification (ISCI) key), a program genre, or another type of textual or numeric metadata, for instance.

The content-distribution system 102 can associate the first fingerprint data with the first metadata in various ways. For instance, in the case where the first fingerprint data includes multiple fingerprints with each fingerprint representing a corresponding frame of the first content, the content-distribution system 102 can associate each fingerprint with a corresponding transmission time-stamp and/or with other corresponding first metadata.

During a time-period T3, the content-distribution system 102 can transmit the first fingerprint data and the first metadata to the fingerprint-matching server 106. The content-distribution system 102 can transmit the first fingerprint data and the first metadata at a given interval. For example, every two seconds, the content-distribution system 102 can transmit the first fingerprint data and the first metadata that it generated during that most recent two-second time-period.

C. Operations Related to the Content-Presentation Device Receiving Second Content During a time-period T4, the content-presentation device 104 can receive content from the content-distribution system 102. This content is referred to herein as "second content." In one example, the second content is the SECOND CONTENT 312 shown in FIG. 3.

During a time-period T5, the content-presentation device 104 can generate fingerprint data representing the second content. This fingerprint data is referred to herein as "second fingerprint data." The content-presentation device 104 can generate the second fingerprint data using any content fingerprinting process now known or later developed. The content-presentation device 104 can generate the second fingerprint data at various rates, such as at the rate of one fingerprint per frame of the second content. The second fingerprint data can be or include some or all of these generated fingerprints.

The content-presentation device 104 can access the second content at various points within the content-presentation device 104. As one example, the content-presentation device 104 can access the second content as it is being received by an input buffer (e.g., an HDMI buffer) of the content-presentation device 104. In another configuration, the content-presentation device 104 can access the second content as it is being received by a display buffer of the content-presentation device 104. In this configuration, the second content can therefore be content that the content-presentation device 104 not only receives, but also outputs for presentation.

Also during the time-period T5, the content-presentation device 104 can generate metadata associated with the second content and/or the second fingerprint data. This metadata is referred to herein as "second metadata." As one example, the second metadata can be or include a receipt time-stamp, which represents a time-point at which the content-presentation device 104 received the second content. The content-presentation device 104 can determine the receipt time-stamp in various ways, such as based on a time clock that is synchronized to a reference clock. As noted above, the content-presentation device 104 can access the second content at various points within the content-presentation device 104. In one example, the point at which the second content is accessed can be considered the "receipt" point for purposes of determining the receipt time-stamp.

In practice, while the first metadata is likely to be or include a channel identifier, the second metadata is likely to not be nor include a channel identifier.

The content-presentation device 104 can associate the second fingerprint data with the second metadata in various ways. For instance, where the second fingerprint data includes multiple fingerprints with each fingerprint representing a corresponding frame of second content, the content-presentation device 104 can associate each second fingerprint with a corresponding receipt time-stamp and/or other corresponding metadata.

During a time-period T6, the content-presentation device 104 can transmit the second fingerprint data and the second metadata to the fingerprint-matching server 106. The content-presentation device 104 can transmit the second fingerprint data and the second metadata at a given interval. For example, every two seconds, the content-presentation device 104 can transmit the second fingerprint data and the second metadata that it generated during that most recent two-second time-period.

D. Operations Related to Identifying a Channel on which the Content-Presentation Device is Receiving the Second Content During a time-period T7, the fingerprint-matching server 106 can receive the first fingerprint data and the first metadata from the content-distribution system 102. As noted above, the first fingerprint data represents the first content transmitted by the content-distribution system 102 on the channel. As noted above, the first metadata can, and for the purposes of this described example does, identify the channel. In this way, the first content can be considered as content being transmitted on an identified channel.

During a time-period T8, the fingerprint-matching server 106 can receive the second fingerprint data and the second metadata from the content-presentation device 104. As noted above, the second fingerprint data represents the second content received by the content-presentation device 104. However, as noted above, the associated metadata may not, and for the purposes of this described example does not, identify the channel. In this way, the second content can be considered as content being received on an unidentified channel.

During a time-period T9, the fingerprint-matching server 106 can compare the first fingerprint data and the second fingerprint data to determine whether there is a match. In this disclosure, this type of match attempt, namely a match attempt between (i) reference fingerprint data representing content being transmitted on an identified channel and (ii) query fingerprint data representing content being received on an unidentified channel, is referred to herein as a "cold match attempt."

During a time-period T10, based on the comparing, the fingerprint-matching server 106 can detect a match between the first fingerprint data and the second fingerprint data. The fingerprint-matching server 106 can compare and/or detect a match between fingerprint data using any content fingerprint comparing and matching technique now known or later developed. An example fingerprint comparing and matching technique is described in U.S. Pat. No. 9,146,990 issued Sep. 29, 2015, the entirety of which is hereby incorporated by reference herein.

To effectively compare the first fingerprint data and the second fingerprint data, the fingerprint-matching server 106 may need to account for a content-transmission delay. For context, in the case where the content-distribution system 102 transmits a given frame of content on a given channel at a time-point A, for various reasons, the content-presentation device 104 may not receive that frame until a time-point B that is later (e.g., ten seconds later) than the time-point A. This type of delay is referred to herein as a "content-transmission delay."

In one example, the time-point A, the time-point B, and the content-transmission delay can be the TIME-POINT A 314, the TIME-POINT B 316, and the CONTENT-TRANSMISSION DELAY 318, respectively, shown FIG. 3. Note that FIG. 3 is for illustration purposes and is not necessarily to scale at least with respect to time. In practice, the actual amount of content-transmission delay may be different from the amount shown.

To help the fingerprint-matching server 106 effectively compare the first fingerprint data with the second fingerprint data, the fingerprint-matching server 106 may need to account for such a content-transmission delay. In one example, the fingerprint-matching server 106 can do this by comparing the first fingerprint data that it receives at a receipt time-point with the second fingerprint data that it receives during a time-period defined by a starting time-point and an ending time-point. The starting time-point can be the receipt time-point plus an offset representing an anticipated content-transmission delay (e.g., ten seconds), minus a tolerance a time-period (e.g., two seconds). The ending time-point can be the receipt time-point plus the offset (e.g., ten seconds), plus the tolerance a time-period (e.g., two seconds). As such, in one example where the anticipated content-transmission delay is 10 seconds, the fingerprint-matching server 106 can compare first fingerprint data that it receives at a receipt time-point with second fingerprint data that it receives during a time-period between (i) the receipt time-point plus eight seconds and (ii) receipt time-point plus twelve seconds.

In some cases, the fingerprint-matching server 106 can determine a content-transmission delay, which it can use to select an appropriate offset for use in determining the starting and ending time-points, as described above. The fingerprint-matching server 106 can determine the content-transmission delay in various ways. For example, after the fingerprint-matching server 106 detects a match based on a cold match attempt, the fingerprint-matching server 106 can determine the content-transmission delay as a difference between the corresponding transmission time-stamp (of the first metadata) and the corresponding receipt time-stamp (of the second metadata), for example. Notably, the content-transmission delay can vary from channel to channel.

During a time-period T11, based on the detected match, the fingerprint-matching server 106 can identify the channel on which the second content is being received by the content-presentation device 104. In one example, the fingerprint-matching server 106 can identify the channel based on the channel identifier metadata associated with the first fingerprint data used to detect the match.

Notably, in practice, since there are likely to be multiple potential channels on which the content-presentation device 104 is receiving the second content, the fingerprint-matching server 106 is likely to compare the second fingerprint data with multiple instances of first fingerprint data (each representing a different respective instance of first content on a different respective channel), to determine which of those multiple instances matches the second fingerprint data.

Also, in some cases, the fingerprint-matching server 106 can detect a match between the second fingerprint data and each of multiple instances of first fingerprint data (each representing a different respective instance of first content on a different respective channel). This is referred to herein as a "multimatch scenario" and can occur for various reasons. For example, this can occur when the content-distribution system 102 is transmitting the same or similar content on more than one channel at or about the same time. In this scenario, the fingerprint-matching server 106 can perform additional operations to identity, from among the multiple channels associated with the multimatch scenario, on which specific channel the content-presentation device 104 is receiving the second content. The fingerprint-matching server 106 can do this using any channel multimatch disambiguation technique now known or later developed. An example channel multimatch disambiguation technique is described in U.S. Pat. No. 9,992,533 issued Jun. 5, 2018, the entirety of which is hereby incorporated by reference herein.

E. Operations Related to Determining Historical Content Consumption Data

During a time-period T12, the fingerprint-matching server 106 can generate metadata associated with the identified channel. For example, the metadata can be or include a channel identification time-stamp. The fingerprint-matching server 106 can determine the channel identification time-stamp in various ways, such as based on a time clock that is synchronized to a reference clock. In another example, the metadata can be or include a device identifier that identifies the content-presentation device 104 that is receiving content on the identified channel. The fingerprint-matching server 106 can determine the device identifier in various ways, such as by receiving it from the content-presentation device 104. In another example, the fingerprint-matching server 106 can receive data (e.g., device registration data) from the content-presentation device 104 and can use mapping data to map the received data to determine the device identifier.

During a time-period T13, the fingerprint-matching server 106 can transmit an indication of the identified channel and the associated metadata to the data-management system 110.

During a time-period T14, the data-management system 110 can receive the indication of the identified channel and the associated metadata from the fingerprint-matching server 106.

The data-management system 110 can use the received indication of the identified channel and the associated metadata, perhaps with other data, to determine when the content-presentation device 104 has received content on the identified channel, what specific content the content-presentation device 104 has received, etc. This type of data is referred to herein as "historical content consumption data."

As such, during a time-period T15, the data-management system 110 can determine historical content consumption data associated with the content-presentation device 104.

F. Operations Related to the Content-Distribution System Transmitting Third Content As noted above, the fingerprint-matching server 106 can identify the channel on which the content-presentation device 104 is receiving the second content.

During a time-period T16, the content-distribution system 102 can transmit content on the identified channel to the content-presentation device 104. This content is referred to herein as "third content." In one example, the third content is the THIRD CONTENT 320 shown in FIG. 3. In practice, the content-distribution system 102 is likely to transmit the third content shortly after (e.g., immediately after or a few seconds or minutes after) transmitting the first content.

During a time-period T17, the content-distribution system 102 can generate fingerprint data representing the third content. This fingerprint data is referred to herein as "third fingerprint data."

Also during the time-period T17, the content-distribution system 102 can generate metadata associated with the third content and/or the third fingerprint data. This metadata is referred to herein as "third metadata." The content-distribution system 102 can also associate the third fingerprint data with the third metadata.

During a time-period T18, the content-distribution system 102 can transmit the third fingerprint data and the third metadata to the fingerprint-matching server 106.

The content-distribution system 102 can transmit the third content, generate the third fingerprint data, generate the third metadata, associate the third fingerprint data with the third metadata, and transmit the third fingerprint data and the third metadata in various ways, such as ways that are the same as or similar to those described above in connection with transmitting the first content, generating the first fingerprint data, generating the first metadata, associating the first fingerprint data with the first metadata, and transmitting the first fingerprint data and the first metadata.

G. Operations Related to the Content-Management System Receiving a Modifiable Content-Segment During a time-period T19, the content-management system 108 can receive content in the form of a content segment that has been identified as a candidate to be modified. This content is referred to herein as a "modifiable content-segment" or "fourth content." In one example, the modifiable content-segment is the MODIFIABLE CONTENT-SEGMENT 322 shown in FIG. 3.

The modifiable content-segment can take various forms. For example, the modifiable content-segment can be an advertisement segment (e.g., a commercial) or a program segment. As such, in one example, the modifiable content-segment can be an advertisement segment that has been identified as a candidate to be modified, perhaps by way of being replaced with a different advertisement segment, and/or by way of having content overlaid thereon.

In one example, a user, perhaps associated with the content-distribution system 102, can facilitate uploading the modifiable content-segment to the content-management system 108, such that the content-management system 108 can receive it in this way.

During a time-period T20, the content-management system 108 can generate fingerprint data representing the modifiable content-segment. This fingerprint data is referred to herein as "fourth fingerprint data." The content-management system 108 can generate the fourth fingerprint data using any fingerprint generation technique now known or later developed. The content-management system 108 can generate the fourth fingerprint data at a given rate, such as at the rate of one fingerprint per frame of the fourth content. The fourth fingerprint data can be or include some or all of these generated fingerprints.

Also during the time-period T20, the content-management system 108 can generate metadata associated with the modifiable content-segment and/or the fourth fingerprint data. This metadata is referred to herein as "fourth metadata." As one example, the fourth metadata can be or include a duration of the modifiable content-segment. The content-management system 108 can determine the duration in various ways, such as based on the fingerprint generation process. For example, in the case where the content-management system 108 generating the fourth fingerprint data involves generating one fingerprint per frame, where the modifiable content-segment has a frame rate of 30 frames per second, and where the fingerprinting process results in 300 fingerprints being generated, the content-management system 108 can deduce that the modifiable content-segment has a duration of ten seconds. The metadata can also be or include other information about the modifiable content-segment, such as a content segment identifier, a title, and/or specifics about permissible ways in which the modifiable content-segment can be modified, etc.

During a time-period T21, the content-management system 108 can transmit the fourth fingerprint data and the fourth metadata to the fingerprint-matching server 106.

In practice, the content-management system 108 is likely to receive many modifiable content-segments. In such situations, the content-management system 108 can perform one or more of the operations described above, as appropriate for each of the many received modifiable content-segments. As such, the content-management system 108 can transmit many instances of fourth fingerprint data, each corresponding with a different respective modifiable content-segment, to the fingerprint-matching server 106.

H. Operations Related to the Fingerprint-Matching Server Identifying an Upcoming Content Modification Opportunity on the Identified Channel During a time-period T22, the fingerprint-matching server 106 can receive the third fingerprint data and the third metadata from the content-distribution system 102. As noted above, the third fingerprint data represents the third content transmitted by the content-distribution system 102 on the identified channel.

During a time-period T23, the fingerprint-matching server 106 can receive the fourth fingerprint data and the fourth metadata from the content-management system 108. As noted above, the fourth fingerprint data represents the modifiable content-segment.

During a time-period T24, the fingerprint-matching server 106 can compare at least a portion of the third fingerprint data with at least a portion of the fourth fingerprint data to determine whether there is a match.

During a time-period T25, based on the comparing, the fingerprint-matching server 106 can detect a match between the at least a portion of the third fingerprint data and the at least a portion of the fourth fingerprint data. The fingerprint-matching server 106 can compare and/or detect a match between fingerprint data using any content fingerprint comparing and matching process now known or later developed.

During a time-period T26, based on the detected match, the fingerprint-matching server 106 can determine that at least a portion of the modifiable content-segment is included within the third content, and therefore can identify an upcoming content modification opportunity on the identified channel. For example, the fingerprint-matching server 106 can determine that at least a beginning portion of the MODIFIABLE CONTENT-SEGMENT 322 is included within the THIRD CONTENT 320, as shown in FIG. 3, and therefore can identify an upcoming content modification opportunity.

As noted above, the fingerprint-matching server 106 can generate third metadata, which can be the same as or similar to the first metadata. As such, the third metadata can be or include a transmission time-stamp and/or a channel identifier, for example. However, the third metadata can also be or include a position of at least a portion of the modifiable content-segment within the third content. In one example, the metadata can specify this using a starting frame marker and an ending frame marker, each corresponding with a respective frame of the third content. The fingerprint-matching server 106 can determine the starting frame marker and the ending frame marker based on the matching.

Notably, in practice, since there are likely to be multiple potential modifiable content-segments where portions thereof could be included within the third content, the fingerprint-matching server 106 is likely to compare at least a portion of the third fingerprint data with at least a portion of multiple instances of fourth fingerprint data (each representing a different respective instance of a modifiable content-segment), to determine which of those multiple instances of the fourth fingerprint data has a portion that matches the at least a portion of the third fingerprint data.

I. Operations Related to Preparing the Content-Presentation Device to Perform a Content-Modification Operation in Connection with the Identified Upcoming Content Modification Opportunity During a time-period T27, based on the detected match, the fingerprint-matching server 106 can transmit the third fingerprint data and the third metadata to the content-presentation device 104 data to facilitate preparing the content-presentation device 104 to perform a content-modification operation in connection with the identified upcoming content modification opportunity.

During a time-period T28, the content-presentation device 104 can receive the third fingerprint data and the third metadata from the fingerprint-matching server 106.

During a time-period T29, the content-presentation device 104 can receive content on the identified channel. This content is referred to herein as "fifth content." In one example, the fifth content is the FIFTH CONTENT 324 shown in FIG. 3.

For various reasons (e.g., due to a transmission delay associated with transmitting fingerprint data and metadata being shorter that the content-transmission delay), the content-presentation device 104 can receive the third fingerprint data and the third metadata from the fingerprint-matching server 106 before receiving the fifth content from the content-distribution system 102. In this way, the content-presentation device 104 can receive fingerprint data representing content that the content-presentation device 104 is expecting to receive shortly thereafter, and that the content-presentation device should actually receive shortly thereafter unless an interruption event (e.g., a channel-change event) occurs.

In practice, similar to how the content-distribution system 102 is likely to transmit the third content shortly after (e.g., immediately after or a few seconds or minutes after) transmitting the first content, the content-presentation device 104 is likely to receive the fifth content shortly after (e.g., immediately after or a few seconds or minutes after) receiving the second content.

During a time-period T30, the content-presentation device 104 can output for presentation at least a portion of the fifth content. For example, referring to FIG. 3, the content-presentation device can output for presentation the portion of the FIFTH CONTENT 324 that is the end portion of the PROGRAM SEGMENT A 304-A.

As noted above, in some situations, even though the content-presentation device 104 receives content from the content-distribution system 102, it can be desirable for the content-presentation device 104 to perform a content-modification operation so that the content-presentation device 104 can output for presentation alternative content instead of at least a portion of the received content.

As such, even though the content-presentation device 104 receives the fifth content and outputs for presentation at least a portion of the fifth content, it can be desirable for the content-presentation device 104 to perform a content-modification operation so that the content-presentation device 104 can also output for presentation alternative content instead of at least another portion (e.g., the remaining portion) of the fifth content. For example, referring to FIG. 3, it can be desirable for the content-presentation device 104 to replace at least a portion of the AD SEGMENT B 304-B with at least a portion of a different advertisement segment that is perhaps more targeted to the end-user. As another example, it can be desirable for the content-presentation device 104 to overlay on at least a portion of the AD SEGMENT B 304-B, overlay content that enhances at least a portion of the AD SEGMENT B 304-B in a way that is again perhaps more targeted to the end-user.

During a time-period T31, the content-presentation device 104 can generate fingerprint data representing the fifth content. This fingerprint data is referred to herein as "fifth fingerprint data." The content-distribution system 102 can generate the fifth fingerprint data using any content fingerprinting process now known or later developed. The content-presentation device 104 can generate the fifth fingerprint data at various rates, such as at the rate of one fingerprint per frame of the fifth content. The fifth fingerprint data can be or include some or all of these generated fingerprints.

Also during the time-period T31, the content-presentation device 104 can generate metadata associated with the fifth content and/or the fifth fingerprint data. This metadata is referred to herein as "fifth metadata."

The content-presentation device 104 can receive the fifth content, generate the fifth fingerprint data, generate the fifth metadata, associate the fifth fingerprint data with the fifth metadata in various ways, such as ways that are the same as or similar to those described above in connection with receiving the second content, generating the second fingerprint data, generating the second metadata, and associating the second fingerprint data with the second metadata.

As noted above, the content-presentation device 104 can receive the third fingerprint data from the fingerprint-matching server 106 and can generate the fifth fingerprint data.

During a time-period T32, the content-presentation device 104 can compare the third fingerprint data and the fifth fingerprint data to determine whether there is a match.

During a time-period T33, based on the comparing, the content-presentation device 104 can detect a match between the third fingerprint data and the fifth fingerprint data. In this disclosure, this type of match attempt, namely a match attempt between (i) reference fingerprint data representing content transmitted by the content-distribution system 102 on an identified channel (at least based on the most recent channel identification analysis), and (ii) query fingerprint data representing content being received by the content-presentation device 104 on the same identified channel, is referred to herein as a "hot match attempt." The fingerprint-matching server 106 can compare and/or detect a match between fingerprint data using any content fingerprint comparing and matching process now known or later developed.

During a time-period T34, based on the detected match, the content-presentation device 104 can determine a time-point at which the identified upcoming modification opportunity starts. This is referred to herein as the "modification start-time." In one example, the modification start-time is the MODIFICATION START-TIME 326 as shown FIG. 3.

In one example, the content-presentation device 104 can determine the modification start-time by starting with the transmission time-stamp associated with the starting frame marker (which, as described above, can be or be included in the third metadata) and adding the content-transmission delay to that transmission time-stamp, to arrive at the modification start-time.

As another example, the content-presentation device 104 can determine the modification start-time by first establishing a synchronous lock between the third content, the third fingerprint data, and/or the third metadata on the one hand, and the fifth content, the third fifth fingerprint data, and/or the fifth metadata, on the other hand. The content-presentation device 104 can establish the synchronous lock using any synchronous lock technique now known or later developed. An example synchronous lock technique is described in U.S. Pat. No. 10,506,275 issued Dec. 10, 2019, the entirety of which is hereby incorporated by reference herein. Another example synchronous lock technique is described in U.S. Pat. App. Pub. No. 2020/0029108 published Jan. 23, 2020, the entirety of which is hereby incorporated by reference herein.

The content-presentation device 104 can then determine the modification start-time by determining a time-period between (i) a current receipt time-stamp associated with a first portion of the fifth content that the content-presentation device 104 is currently receiving and (ii) based on the synchronous lock, an anticipated receipt time-stamp associated with a second portion of the fifth content that is the start of the modifiable content-segment, and then adding the determined time-period to the current receipt time-stamp, to arrive at the modification start-time.

Also during the time-period T34, based on the detected match, the content-presentation device 104 can determine a time-point at which the identified upcoming modification opportunity ends. This is referred to herein as the "modification end-time." In one example, the modification end-time is the MODIFICATION END-TIME 328 as shown FIG. 3.

In one example, the content-presentation device 104 can determine the modification end-time by starting with the modification start-time and adding the duration of the modifiable content-segment (which, as described above, can be or be included in the fourth metadata) to the modification start-time, to arrive at the modification end-time.

Notably, if the content-presentation device 104 performs a hot match attempt and does not detect a match, the content-presentation device 104 can determine that the content-presentation device 104 is no longer receiving content on the most recently identified channel. In response, the content-presentation device 104 can repeat one or more of the operations described above so that the fingerprint-matching server 106 can perform another cold match attempt, to attempt to identify the channel again.

During a time-period T35, the content-presentation device 104 can transmit a request for content for use in connection with performing the content-modification operation, to the content-management system 108. This content is referred to herein as "supplemental content." In one example, the content-presentation device 104 can transmit the request before the modification start-time (e.g., ten seconds before). In some cases, the request can include selection criteria for the supplemental content, which the content-presentation device 104 can determine based on the third metadata that the content-presentation device 104 receives from the fingerprint-matching server 106, for instance.

For example, the selection criteria can specify a requested type of content (e.g., a replacement content segment or overlay content), duration (e.g., 15 seconds, 30 seconds, or 60 seconds), aspect ratio (e.g., 4:3 or 16:9), and/or resolution (e.g., 720p or 1080p).

During a time-period T36, the content-management system 108 can receive the request and use it as a basis to select supplemental content from among multiple supplemental content items that are available for selection. In some cases, the content-management system 108 can receive and consider various data to help inform which supplemental content to select. For example, the content-management system 108 can receive historical content consumption data for the content-presentation device 104 from the data-management system 110 and/or the content-management system 108 can receive demographic data from a demographic data provider. The content-management system 108 can then use at least the received historical content consumption data and/or the received demographic data as a basis to select the supplemental content.

The content-management system 108 can cause the selected supplemental content to be transmitted to the content-presentation device 104. In one example, the content-management system 108 can do this by communicating with a supplemental-content delivery system 112 that can host the supplemental content. The supplemental-content delivery system 112 can take various forms and can include various components, such as a content distribution network (CDN).

During a time-period T37, the content-management system 108 can transmit a request for a link (e.g., a Uniform Resource Identifier (URI) or a Uniform Resource Locator (URL)) pointing to the hosted supplemental content, to the supplemental-content delivery system 112.

During a time-period T38, the supplemental-content delivery system 112 can receive and respond to the request for the link by transmitting the requested link to the content-management system 108.

During a time-period T39, the content-management system 108 can then in turn transmit the link to the content-presentation device 104.

During a time-period T40, the content-presentation device 104 can receive the link, which it can use to retrieve the supplemental content from the supplemental-content delivery system 112, such that the content-presentation device 104 can use the retrieved supplemental content in connection with performing the content-modification operation. In one example, the content-presentation device 104 can retrieve the supplemental content and store the supplemental content in a data-storage unit of the content-presentation device 104.

As such, in some examples, the content-presentation device 104 can receive the modifiable content-segment from one source (e.g., the content-distribution system 102), and the supplemental content from another source (e.g., the supplemental-content delivery system 112). These segments can be transmitted to, and received by, the content-presentation device 104 in different ways. For example, the content-distribution system 102 can transmit, and the content-presentation device 104 can receive, the modifiable content-segment as a broadcast stream transmission, whereas the supplemental-content delivery system 112 can transmit, and the content-presentation device 104 can receive, the supplemental content as an over-the-top (OTT) transmission. In this context, in one example, the content-distribution system 102 can receive the modifiable content-segment via one communication interface (e.g., an HDMI interface), and the content-presentation device 104 can receive the supplemental content via a different communication interface (e.g., an Ethernet or WI-FI interface).

J. Operations Related to the Content-Presentation Device Performing a Content-Modification Operation At a time-period T41, the content-presentation device 104 can perform the content-modification operation. The content-presentation device 104 can do this in various ways, perhaps depending on the type of content-modification operation to be performed.

In one example, the content-presentation device 104 performing a content-modification operation can involve the content-presentation device 104 modifying the modifiable content-segment by replacing it with supplemental content. This is referred to herein as a "content-replacement operation." For example, in this scenario, the content-presentation device 104 can receive a linear sequence of content segments that includes the modifiable content-segment and the associated metadata, and can also receive the supplemental content segment, as described above. The content-presentation device 104 can output for presentation the sequence of content segments up until the modification start-time (which corresponds to the start of the modifiable content-segment), at which time the content-presentation device 104 can switch to outputting for presentation the supplemental content instead. Then, at the modification end-time (which corresponds to the end of the modifiable content-segment), the content-presentation device 104 can switch back to outputting for presentation the content that follows in the linear sequence of content segments (or perhaps to other content, such as additional supplemental content that is replacing another modifiable content-segment).

In one example, the operation of the content-presentation device 104 switching from outputting the sequence of content segments to outputting the supplemental content can involve using various buffers of the content-presentation device 104. For example, this can involve the content-presentation device 104 switching from using first data in a first input buffer where the sequence of content segments is being received to using second data in a second input buffer where the supplemental content is being received, to populate a display buffer.

As such, according to one example as illustrated in FIG. 3, by performing a content-replacement operation, the content-presentation device 104 can replace the AD SEGMENT B 302-B with the AD SEGMENT B 304-B. As a result, rather than outputting for presentation the RECEIPT SEQUENCE 304, the content-presentation device can instead output for presentation the FIRST MODIFIED SEQUENCE 306.

In another example, the content-presentation device 104 performing a content-modification operation can involve the content-presentation device 104 modifying a modifiable content-segment by overlaying on the modifiable content-segment, overlay content (referred to herein as a "content overlay operation"). For example, in this scenario, the content-presentation device 104 can again receive a linear sequence of content segments that includes the modifiable content-segment and the associated metadata, and the content-presentation device 104 can also receive the supplemental content, as described above.

The content-presentation device 104 can then output for presentation the modifiable content-segment as it ordinarily would, except that starting at the modification start-time, the content-presentation device 104 can start overlaying the supplemental content on the modifiable content-segment. The content-presentation device 104 can continue overlaying the supplemental content until the modification end-time. In this way, the content-presentation device 104 can overlay the supplemental content during at least some temporal portion of the modifiable content-segment.

In one example, the operation of the content-presentation device 104 overlaying supplemental content on the modifiable content-segment can involve using various buffers of the content-presentation device 104. For example, this can involve the content-presentation device 104 using a portion of first data in a first input buffer where the sequence of content segments is being received together with second data in a second input buffer where the supplemental content is being received, for the purposes of populating a display buffer. In this way, the content-presentation device can combine relevant portions of the modifiable content-segment (i.e., all portions except those representing region where the supplemental content is to be overlaid) together with the supplemental content to be used as an overlay, to create the desired modifiable content-segment plus the supplemental content overlaid thereon.

As such, according to one example as illustrated in FIG. 3, by performing a content overlay operation, the content-presentation device 104 can overlay supplemental content on the AD SEGMENT B 302-B, thereby modifying it to AD SEGMENT B 304-B'. As a result, rather than outputting for presentation the RECEIPT SEQUENCE 304, the content-presentation device can instead output for presentation the SECOND MODIFIED SEQUENCE 308.

K. Tracking and Reporting Operation-Related Data

To help facilitate performance of various operations such as the content-presentation device 104 performing a content-modification operation and to help allow for the tracking and reporting of such operations, the content-modification system 100 and/or components thereof can track and report various operation-related data at various times and in various ways.

As just a few illustrative examples, responsive to certain operations being performed, such as those described herein, the fingerprint-matching server 106, the content-presentation device 104, and/or another entity can generate, store, and/or transmit messages that indicate (i) that a modifiable content-segment has been identified, (ii) that a channel has been identified/confirmed (perhaps based on a match detected as a result of a cold or hot match attempt), (iii) that an upcoming content modification opportunity on the identified channel has been identified, (iv) that supplemental content has been requested, (v) that supplemental content has been received, (vi), that a content-modification operation has started, (vii) that a content-modification operation has ended, and/or (viii) that a scheduled content-modification operation was aborted and/or not performed for any given reason. In some cases, these messages can include other metadata related to these operations. For example, the metadata can specify relevant timing information, device identifiers, channel identifiers, content segment identifiers, etc.

L. Watermark-Based Techniques

Although this disclosure has described the content-modification system 100 using fingerprint-based technology to perform various operations and to provide various features, in some examples, the content-modification system 100 can use watermark-based techniques instead of, or in addition to, fingerprint-based techniques, to perform these and other operations and to provide these and other features.

For example, as an alternative to the fingerprint-based technique described above in which the fingerprint-matching server 106 identifies the channel on which the second content is being received by the content-presentation device 104, the content-distribution system 102 or another entity can insert a channel identifier in the form of a watermark into the second content, such that the fingerprint-matching server 106, the content-presentation device 104, or another entity can extract the channel identifier and use it to identify the channel on which the second content is being received by the content-presentation device 104.

In this context, the content-modification system 100 can employ any watermark technique now known or later developed.

M. Operations Related to a Probability-Based Selection of Content-Presentation Devices for Performing a Content-Modification Operation As discussed above, the present disclosure provides a feature in which the content-modification system 100 selects content-presentation devices to perform a content-modification operation (e.g., DAI) in connection with an upcoming content modification opportunity based at least in part on an evaluation of each such content-presentation device's probability of success of performing the content-modification operation.

Example operations related to this feature will now be described in more detail. Although the following example operations will be described herein primarily as being performed by a fingerprint-matching server 106, other entities of the content-modification system 100 could perform one or more of such operations in alternative embodiments.

To begin with, the fingerprint-matching server 106 can identify an upcoming content modification opportunity on a channel. The upcoming content-modification opportunity can relate to a modifiable content-segment transmitted by the content-distribution system 102 on the channel. In some examples, the act of identifying the upcoming content modification opportunity can involve any one or more of the operations discussed above.

In other examples, the act of identifying the upcoming content modification opportunity can involve the fingerprint-matching server 106 accessing broadcast schedule data associated with the channel and using the accessed broadcast schedule data to identify the upcoming content modification opportunity on the channel. In some configurations, this can involve the fingerprint-matching server 106 accessing an industry standard coding identification (ISCI) key and/or a house identifier. For example, this can involve the fingerprint-matching server 106 (i) accessing first broadcast schedule data associated with the channel, (ii) extracting, from among the accessed first broadcast schedule data associated with the channel, second broadcast schedule data related to one or more broadcast-related events scheduled within a predefined upcoming duration, and (iii) using the extracted second broadcast schedule data to identify the upcoming content-modification opportunity on the channel. As another example, the fingerprint-matching server 106 using the accessed broadcast schedule data to identify an upcoming content-modification opportunity on the channel can involve the fingerprint-matching server 106 (i) detecting a match between the accessed broadcast schedule data and reference data that corresponds with a reference modifiable content-segment, and (ii) identifying the upcoming content-modification opportunity on the channel based at least in part on the detected match.

Using the broadcast schedule data for content modification opportunities can be advantageous because it can provide the content-modification system 100 with more time to prepare content-modification devices for such opportunities. For instance, such content-presentation devices will have more time to download a replacement advertisement segment for use in performing DAI.

In some situations, another component of the content-modification system 100, such as the content-management system 108, can access the broadcast schedule data and transmit it to the fingerprint-matching server 106 and/or identify the upcoming content-modification opportunity and transmit an identifier of the opportunity to the fingerprint-matching server 106.

In another example, the act of identifying the upcoming content modification opportunity can involve the fingerprint-matching server 106 accessing in-band message data that was extracted from content transmitted by a content-distribution system on the channel and using the accessed in-band message data to identify the upcoming content modification opportunity on the channel. For example, the accessed in-band message data can include a watermark or other indicator that there is an upcoming content modification opportunity on the channel. The watermark or other indicator can include, for instance, a modification start-time. Other examples are possible as well.

In response to identifying the upcoming content modification opportunity on the channel, the fingerprint-matching server 106 can identify a group of multiple content-presentation devices tuned to the channel. The fingerprint-matching server 106 can identify a given content-presentation device in various ways, and each content-presentation device of the group can be identified in one or more of these ways.

In one example, to identify a content-presentation device (e.g., content-presentation device 104), the fingerprint-matching server 106 can include or remotely access data (e.g., stored in a database) that includes a respective device identifier for each of a plurality of content-presentation devices, as well as indicates and updates, in real-time or near-real-time, the channel to which each content-presentation device is tuned.

In another example, the fingerprint-matching server 106 can detect, using one or more of the fingerprint matching processes described above, a match between reference fingerprint data and query fingerprint data received from a given content-presentation device and identify the channel based on the detected match.

In another example, the fingerprint-matching server 106 can receive, from a given content-presentation device, channel identifier metadata that identifies the channel and can interpret receipt of the channel identifier metadata as indicating that the content-presentation device is currently tuned to the channel. Other examples are possible as well.

In some implementations, the fingerprint-matching server 106 might use certain criteria to select which content-presentation devices to include in the identified group. For example, the fingerprint-matching server 106 might only include a content-presentation device in the identified group if the content-presentation device is within or otherwise associated with a particular geographic area (e.g., DMA). Additionally or alternatively, the fingerprint-matching server 106 might only include a content-presentation device in the identified group if the content-presentation device is associated with a particular demographic and/or end-user interest. To facilitate selection of content-presentation devices using these or other criteria, the fingerprint-matching server 106 can use stored data that maps device identifiers to particular DMAs, demographics, end-user interests, historical content consumption data, etc. Other examples are possible as well.

For each content-presentation device in the identified group, the fingerprint-matching server 106 can determine a respective probability of that content-presentation device successfully performing a respective content-modification operation in connection with the identified upcoming content modification opportunity on the channel.

As discussed above, there can be various factors that can impact whether a content-presentation device is successful in performing a content-modification operation in connection with an upcoming content-modification opportunity. For example, the content-transmission delay between the content-distribution system 102 and the content-presentation device might be short enough where the content-presentation device will not be able to receive (e.g., download) supplemental content in time to replace the modifiable content-segment with the supplemental content at the modification start-time of the upcoming content-modification opportunity.

As another example, the content-presentation device might experience low bandwidth, low download speed, and/or other network issues that can cause the content-presentation device to not receive the supplemental content in time, or otherwise not be able to perform the content-modification operation on time.

As another example, the content-presentation device might receive the supplemental content on time but might encounter an error or other circumstance that causes the content-presentation device to abort or otherwise not perform the content-modification operation. Other examples are possible as well. In one or more of the above-noted situations, the content-modification system 100 might generate and store reporting data indicating the nature of the event(s) that prevented the content-presentation device from performing the content-modification operation.

To determine a probability of a content-presentation device successfully performing its respective content-modification operation in connection with the identified upcoming content modification opportunity on the channel, the fingerprint-matching server 106 can access historical content-modification operation data associated with that content-presentation device. The fingerprint-matching server 106 can use at least the accessed historical content-modification operation data as a basis for determining the probability of that content-presentation device successfully performing the respective content-modification operation (or perhaps any content-modification operation, for that matter) in connection with the identified upcoming content modification opportunity on the channel.

In some examples, the historical content-modification operation data can indicate an extent to which that content-presentation device has successfully performed respective content-modification operations in the past. Additionally or alternatively, the historical content-modification operation data can indicate an extent to which that content-presentation device has successfully performed, in the past, a set of actions to prepare that content-presentation device to perform a content-modification operation (also referred to herein as "preparation actions"). These preparation actions can include one or more operations leading up to the actual content-modification operation itself, such as the content-presentation device retrieving the supplemental content, loading the retrieved supplemental content into an input buffer, and/or outputting content segments up to the modification start-time, among other possibilities.

The above-noted extents can be represented by the historical content-modification operation data in various ways. For example, the historical content-modification operation data can be or include the probability. Additionally or alternatively, the historical content-modification operation data can be or include various information that the fingerprint-matching server 106 can analyze and use to determine the probability.

For example, the historical content-modification operation data can be or include a list of past content modification opportunities for content-modification operations and, for each opportunity, specify (i) a binary indicator as to whether the content-modification operation was performed successfully, (ii) a type of content-modification operation (e.g., DAI, a content-overlay operation, etc.), (iii) a date and time of the content modification opportunity, (iv) a list of the preparation actions that were performed successfully or and/or unsuccessfully, (v) any preparation action that the content-presentation device was unable to perform, (vi) an error code or other description of any errors that were encountered or other event that caused the content-presentation device to not perform the content-modification operation (e.g., too short of a content-transmission delay, low bandwidth, long download times), (vii) the channel on which the opportunity was presented, and/or (viii) a time stamp designating when an error was encountered (and perhaps a designation as to when the error occurred relative to the modification start-time), among other possible information.

As another example, the historical content-modification operation data can be or include statistics for past content modification opportunities, such as a total number of opportunities, a total percentage of opportunities where a content-modification operation was performed unsuccessfully, and/or a respective percentage of unsuccessful content-modification operations for each type of content-modification operation (e.g., replacement, overlay, etc.). For instance, the historical content-modification operation data might indicate that the content-presentation device has successfully performed content-replacement operations 75% of the time, but has successfully performed content-overlay operations 95% of the time.

In some cases, the content-modification system 100 might transmit an instruction to a content-presentation device to cause the content-presentation device to perform actions (e.g., the preparation actions) and report the result of such actions, so that the content-modification system 100 can determine whether the content-presentation device is capable of performing a content-modification operation. Such reports can be taken into account in determining the probability of success for that content-presentation device.

In some examples, the historical content-modification operation data can be continuously updated by the content-modification system 100 to reflect the current probability of the content-presentation device successfully performing a content-modification operation. To facilitate this, content-presentation devices in the content-modification system 100 can be configured to provide reporting data associated with the content-modification operations it performs successfully or unsuccessfully.

In determining the probability for the content-presentation device, the fingerprint-matching server 106 can be configured to take into account only a predefined portion of the historical content-modification operation data. For example, the fingerprint-matching server 106 might only determine the probability based on the extent to which that content-presentation device has successfully performed respective content-modification operations and/or preparation actions therefor within a predefined time window (e.g., within the last day, week, or month). As another example, the fingerprint-matching server 106 might only determine the probability based on the extent to which that content-presentation device has successfully performed a particular type of content-modification operation (e.g., replacement or overlay) and/or preparation actions therefor. Other examples are possible as well.

Having determined the probabilities, the fingerprint-matching server 106 can use at least the determined probabilities as a basis to select, from among the content-presentation devices in the identified group, a subgroup of content-presentation devices. For example, the selection of the subgroup of content-presentation devices can be based on the content-presentation devices in the subgroup having respective probabilities that are greater than a threshold amount (e.g., greater than an 85% success rate). As a more specific example, the selection of the subgroup of content-presentation devices can be based on each of the content-presentation devices in the subgroup having a respective probability that is greater than the threshold amount. As another specific example, the selection of the subgroup of content-presentation devices can be based on a majority of, or greater than a threshold quantity of, the content-presentation devices in the subgroup having respective probabilities that are greater than the threshold amount. Other examples are possible as well.

In some implementations, before selecting a subgroup of content-presentation devices, the fingerprint-matching server 106 can divide the identified group into multiple subgroups, compare the respective probabilities of the content-presentation devices of each subgroup with each other subgroup, and select one of the subgroups based on that comparison (e.g., select the subgroup with the highest average probability among the respective content-presentation devices of that subgroup). Other examples are possible as well.

The fingerprint-matching server 106 can then perform actions that facilitate causing each of at least some of the content-presentation devices in the selected subgroup to perform a respective content-modification operation in connection with the identified upcoming content modification opportunity on the channel. For example, these actions can include transmitting, or arranging for another component of the content-modification system 100 to transmit, data to each of at least some of the content-presentation devices in the subgroup that the content-presentation device can use in preparing for and performing a content-modification operation in connection with the content modification opportunity on the channel. Such data can include, for instance, (i) the modification start-time, (ii) the modification end-time, (iii), a link that the content-presentation device can use to download the supplemental content (e.g., a replacement advertisement segment), (iv) the supplemental content itself, and/or (v) an indication of the type of content-modification operation (e.g., replacement, overlay, etc.) is to be performed, among other possibilities. These actions can take other forms as well.

In some situations, the fingerprint-matching server 106 can then perform actions that facilitate causing each of at least some of the content-presentation devices in the selected subgroup to perform the same type of content-modification operation in connection with the identified upcoming content modification opportunity on the channel using the same supplemental content. For example, it might be desirable to have some or all of the content-presentation devices in the subgroup to replace the same advertisement segment broadcast to those content-presentation devices with the same replacement advertisement segment.

In other situations, the fingerprint-matching server 106 can perform a first set of actions that facilitate causing one portion of the content-presentation devices in the selected subgroup to perform one type of content-modification operation (e.g., DAI) in connection with the identified upcoming content modification opportunity on the channel and can also perform a second set of operations that facilitate causing another, different portion of the content-presentation devices in the selected subgroup to perform another, different type of content-modification operation (e.g., content overlay) in connection with the identified upcoming content modification opportunity on the channel. Such portions can be mutually exclusive.

By taking into account the probability of success for content-presentation devices in the manner discussed above, the content-modification system 100 can reliably and efficiently narrow down which content-presentation devices should be performing respective content-modification operations. This can also reduce the time and computational expense in the process of deciding which content-presentation devices should perform such operations and causing those content-presentation devices to perform such operations. Additionally, the chances of the selected content-presentation devices successfully performing respective content-modification operations can be increased, thus making the content-modification process more reliable. These and other advantages provided by this disclosure can be particularly important in situations where it is desirable to cause a large amount (e.g., hundreds or thousands) of content-presentation devices perform a content-modification operation in connection with an upcoming content modification opportunity.

Figure 5:
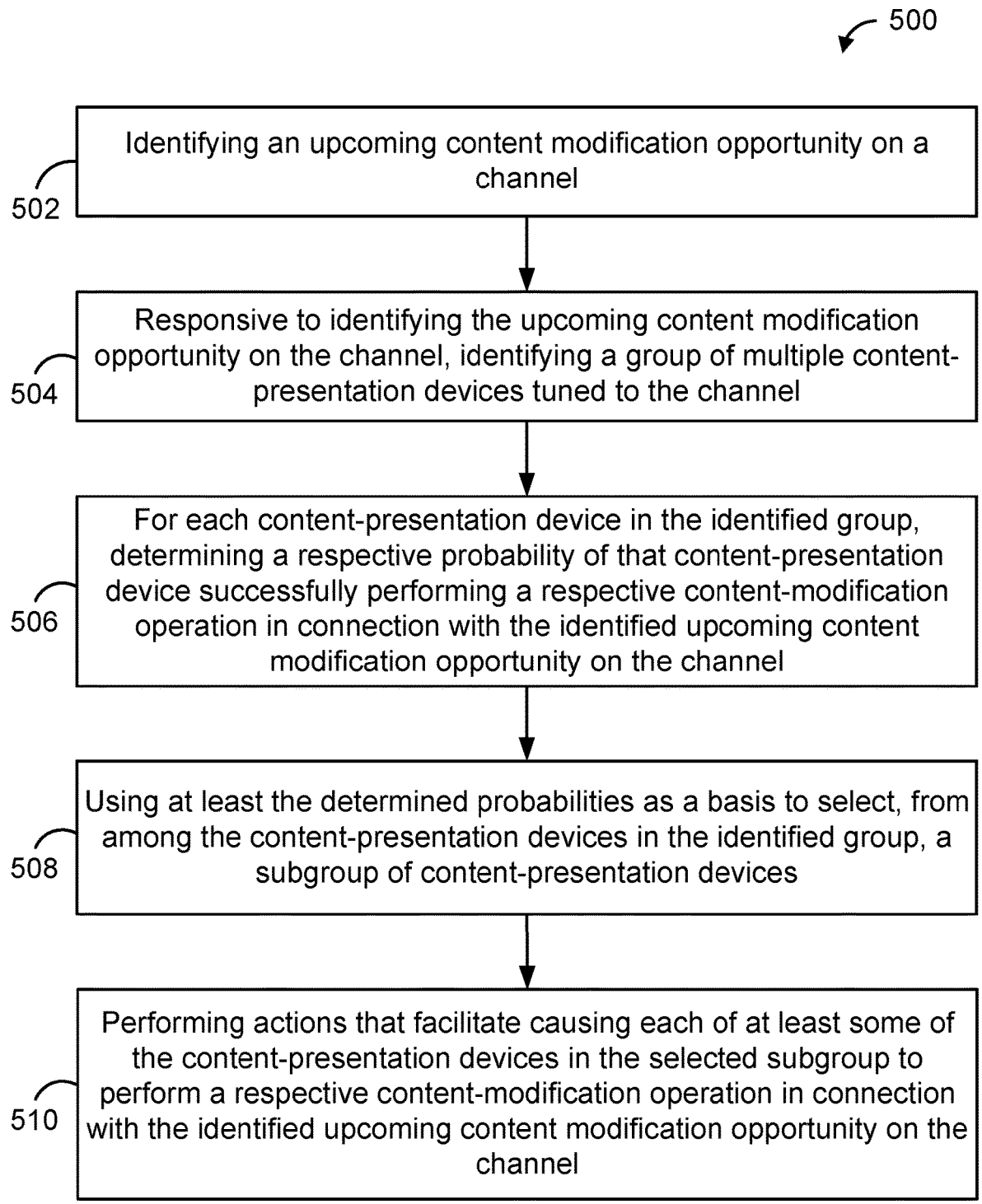
FIG. 5 is a flow chart of an example method.

FIG. 5 is a flow chart of an example method 500. At block 502, the method 500 includes identifying an upcoming content modification opportunity on a channel.

At block 504, the method 500 includes responsive to identifying the upcoming content modification opportunity on the channel, identifying a group of multiple content-presentation devices tuned to the channel.

At block 506, the method 500 includes for each content-presentation device in the identified group, determining a respective probability of that content-presentation device successfully performing a respective content-modification operation in connection with the identified upcoming content modification opportunity on the channel.

At block 508, the method 500 includes using at least the determined probabilities as a basis to select, from among the content-presentation devices in the identified group, a subgroup of content-presentation devices.

At block 510, the method 500 includes performing actions that facilitate causing each of at least some of the content-presentation devices in the selected subgroup to perform a respective content-modification operation in connection with the identified upcoming content modification opportunity on the channel.

The method 500 and related acts can be performed at least in part by the fingerprint-matching server 106. In some implementations, the method 500 and related acts can be performed at least in part by another device within the content-modification system 100.

As discussed above, implementations of the disclosed methods and systems provide technological improvements that are particular to computer networks and computing systems, for example, content-modification systems such as content-modification system 100.

Various technological problems can exist in systems configured to produce and provide content (e.g., targeted content) to end-users, such as inefficiency and computational complexity. These technological problems can be particularly apparent in content-modification systems where numerous content-distribution systems are transmitting large amounts of video content over long periods of time to numerous content-presentation devices, and when it is desired to modify many content segments received and presented by these content-presentation devices. The above-described operations and various implementations thereof can be integrated into these and other content-modification system environments to wholly or partially solve these and other technological problems.

These and other improvements have been described in detail herein, although the operations described herein are for purposes of example and implementations of the disclosed methods and systems can provide other improvements as well.

IV. Example Variations

Although the examples and features described above have been described in connection with specific entities and specific operations, in practice, there are likely to be many instances of these entities and many instances of these operations being performed, perhaps contemporaneously or simultaneously, on a large-scale basis. Indeed, in practice, the content-modification system 100 is likely to include many content-distribution systems (each potentially transmitting content on many channels) and many content-presentation devices, with some or all of the described operations being performed on a routine and repeating basis in connection with some or all of these entities.

In addition, although some of the operations described in this disclosure have been described as being performed by a particular entity, the operations can be performed by any entity, such as the other entities described in this disclosure. Further, although the operations have been recited in a particular order and/or in connection with example temporal language, the operations need not be performed in the order recited and need not be performed in accordance with any particular temporal restrictions. However, in some instances, it can be desired to perform one or more of the operations in the order recited, in another order, and/or in a manner where at least some of the operations are performed contemporaneously/simultaneously. Likewise, in some instances, it can be desired to perform one or more of the operations in accordance with one more or the recited temporal restrictions or with other timing restrictions. Further, each of the described operations can be performed responsive to performance of one or more of the other described operations. Also, not all of the operations need to be performed to achieve one or more of the benefits provided by the disclosure, and therefore not all of the operations are required.

Although certain variations have been described in connection with one or more examples of this disclosure, these variations can also be applied to some or all of the other examples of this disclosure as well and therefore aspects of this disclosure can be combined and/or arranged in many ways. The examples described in this disclosure were selected at least in part because they help explain the practical application of the various described features.

Also, although select examples of this disclosure have been described, alterations and permutations of these examples will be apparent to those of ordinary skill in the art. Other changes, substitutions, and/or alterations are also possible without departing from the invention in its broader aspects as set forth in the following claims.

What is claimed is:

1. A computer-implemented method comprising:
identifying, by at least one computer processor, an upcoming content modification opportunity on a channel, wherein the upcoming content modification opportunity is an upcoming opportunity for a content-presentation device to perform, beginning at a scheduled modification start-time and ending at a scheduled modification end-time, a content-modification operation in which the content-presentation device uses supplemental content to modify a modifiable content-segment received on the channel;
responsive to identifying the upcoming content modification opportunity on the channel, identifying a group of content-presentation devices that are currently receiving content on the channel;
transmitting one or more instructions to the group of content-presentation devices to cause the group of content-presentation devices to perform preparation actions;
receiving a respective report, from each of the content-presentation devices in the group of content presentation devices, of results of implementing the preparation actions;
for each content-presentation device in the group of content-presentation devices, determining a respective probability of the content-presentation device successfully performing a respective content-modification operation in connection with the identified upcoming content modification opportunity on the channel, wherein successful performance of the respective content-modification operation comprises the content-presentation device retrieving, from a supplemental-content delivery system, the supplemental content before the scheduled modification start-time and then completing the content-modification operation by modifying the modifiable content-segment with the supplemental content until the scheduled modification end-time, and wherein determining the respective probability is based, at least in part, on the respective report; and
using at least the determined probabilities as a basis to select, from among the group of content-presentation devices, a subgroup of content-presentation devices for the content-modification operation.

2. The computer-implemented method of claim 1, wherein identifying the upcoming content modification opportunity on the channel comprises:
accessing broadcast schedule data associated with the channel; and
using the accessed broadcast schedule data to identify the upcoming content modification opportunity on the channel.

3. The computer-implemented method of claim 1, wherein identifying the upcoming content modification opportunity on the channel comprises:
accessing in-band message data that was extracted from content transmitted by a content-distribution system on the channel; and
using the accessed in-band message data to identify the upcoming content modification opportunity on the channel.

4. The computer-implemented method of claim 1, wherein selecting the subgroup of content-presentation devices is based on the content-presentation devices in the subgroup having the respective probability greater than a threshold amount.

5. The computer-implemented method of claim 1, further comprising:
determining the respective probability based on an extent to which each of the content-presentation devices has successfully performed their respective one of the preparation actions.

6. The computer-implemented method of claim 1, further comprising:
determining the respective probability based on an extent to which each of the content-presentation devices has successfully performed their respective one of the preparation actions within a predefined time window.

7. The computer-implemented method of claim 1, further comprising:
determining the respective probability based on an extent to which each of the content-presentation devices has successfully performed their respective one of the preparation actions based on a type of successful implementation of one or more specific types of content modification preparation actions.

8. A non-transitory computer-readable storage medium, having stored thereon program instructions that, upon execution by at least one computing device, cause the at least one computing device to perform operations comprising:
identifying an upcoming content modification opportunity on a channel, wherein the upcoming content modification opportunity is an upcoming opportunity for a content-presentation device to perform, beginning at a scheduled modification start-time and ending at a scheduled modification end-time, a content-modification operation in which the content-presentation device uses supplemental content to modify a modifiable content-segment received on the channel;
responsive to identifying the upcoming content modification opportunity on the channel, identifying a group of content-presentation devices that are currently receiving content on the channel;
transmitting one or more instructions to the content-presentation devices in the group of content-presentation devices to cause the content-presentation devices to perform preparation actions;
receiving a respective report, from each of the content-presentation devices in the group of content presentation devices, of results of implementing the preparation actions;
for each content-presentation device in the identified group, determining a respective probability of the content-presentation device successfully performing a respective content-modification operation in connection with the identified upcoming content modification opportunity on the channel, wherein successful performance of the respective content-modification operation comprises the content-presentation device retrieving, from a supplemental-content delivery system, the supplemental content before the scheduled modification start-time and then completing the content-modification operation by modifying the modifiable content-segment with the supplemental content until the scheduled modification end-time, and wherein determining the respective probability comprises determining the respective probability based at least in part on the respective report; and using at least the determined probabilities as a basis to select, from among the content-presentation devices in the identified group, a subgroup of content-presentation devices for the content-modification operation.

9. The non-transitory computer-readable storage medium of claim 8, wherein identifying the upcoming content modification opportunity on the channel includes operations comprising:

accessing broadcast schedule data associated with the channel; and using the accessed broadcast schedule data to identify the upcoming content modification opportunity on the channel.

10. The non-transitory computer-readable storage medium of claim 8, wherein identifying the upcoming content modification opportunity on the channel includes operations comprising:

accessing in-band message data that was extracted from content transmitted by a content-distribution system on the channel; and using the accessed in-band message data to identify the upcoming content modification opportunity on the channel.

11. The non-transitory computer-readable storage medium of claim 8, wherein selecting the subgroup of content-presentation devices is based on the content-presentation devices in the subgroup having the respective probability greater than a threshold amount.

12. The non-transitory computer-readable storage medium of claim 8, the operations further comprising:

determining the respective probability based on an extent to which each of the content-presentation devices has successfully performed their respective one of the preparation actions.

13. The non-transitory computer-readable storage medium of claim 8, the operations further comprising:

determining the respective probability based on an extent to which each of the content-presentation devices has successfully performed their respective one of the preparation actions within a predefined time window.

14. A computing system comprising:

at least one processor; and a non-transitory computer-readable storage medium, having stored thereon program instructions that, upon execution by the at least one processor, cause performance of operations comprising:

identifying an upcoming content modification opportunity on a channel, wherein the upcoming content modification opportunity is an upcoming opportunity for a content-presentation device to perform, beginning at a scheduled modification start-time and ending at a scheduled modification end-time, a content-modification operation in which the content-presentation device uses supplemental content to modify a modifiable content-segment received on the channel;

responsive to identifying the upcoming content modification opportunity on the channel, identifying a group of content-presentation devices that are currently receiving content on the channel;

transmitting one or more instructions to the content-presentation devices in the group of content-presentation devices to cause the content-presentation devices to perform preparation actions;

receiving a respective report, from each of the content-presentation devices in the group of content presentation devices, of results of implementing the preparation actions;

for each content-presentation device in the identified group, determining a respective probability of the content-presentation device successfully performing a respective content-modification operation in connection with the identified upcoming content modification opportunity on the channel, wherein successful performance of the respective content-modification operation comprises the content-presentation device retrieving, from a supplemental-content delivery system, the supplemental content before the scheduled modification start-time and then completing the content-modification operation by modifying the modifiable content-segment with the supplemental content until the scheduled modification end-time, and wherein determining the respective probability comprises determining the respective probability based at least in part on the respective report; and using at least the determined probabilities as a basis to select, from among the content-presentation devices in the identified group, a subgroup of content-presentation devices for the content-modification operation.

15. The computing system of claim 14, wherein identifying the upcoming content modification opportunity on the channel includes the operations further comprising:

accessing broadcast schedule data associated with the channel; and using the accessed broadcast schedule data to identify the upcoming content modification opportunity on the channel.

16. The computing system of claim 14, wherein identifying the upcoming content modification opportunity on the channel includes the operations further comprising:

accessing in-band message data that was extracted from content transmitted by a content-distribution system on the channel; and using the accessed in-band message data to identify the upcoming content modification opportunity on the channel.

17. The computing system of claim 14, the operations further comprising:

determining the respective probability based on an extent to which each of the content-presentation devices has successfully performed their respective one of the preparation actions.

18. The computing system of claim 14, the operations further comprising:

determining the respective probability based on an extent to which each of the content-presentation devices has successfully performed their respective one of the preparation actions within a predefined time window.

19. The computing system of claim 14, the operations further comprising:

determining the respective probability based on an extent to which each of the content-presentation devices has successfully performed their respective one of the preparation actions based on a type of successful implementation of one or more specific types of content modification preparation actions.

20. The computing system of claim 14, wherein selecting the subgroup of content-presentation devices is based on the content-presentation devices in the subgroup having the respective probability greater than a threshold amount.

\* \* \* \* \*